United States Patent
Lockleer et al.

(10) Patent No.: US 9,358,732 B2
(45) Date of Patent: Jun. 7, 2016

(54) BOND ASSEMBLY JIG AND METHOD

(71) Applicant: The Boeing Company, Chicago, IL (US)

(72) Inventors: John C. Lockleer, Everett, WA (US); Doan D. Pham, Lacey, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/842,381

(22) Filed: Sep. 1, 2015

(65) Prior Publication Data
US 2015/0367585 A1 Dec. 24, 2015

Related U.S. Application Data

(62) Division of application No. 13/632,753, filed on Oct. 1, 2012, now Pat. No. 9,149,991.

(51) Int. Cl.
| | |
|---|---|
| *B29C 70/54* | (2006.01) |
| *B29C 70/44* | (2006.01) |
| *B25B 11/02* | (2006.01) |
| *B29D 99/00* | (2010.01) |
| *B29C 33/30* | (2006.01) |

(52) U.S. Cl.
CPC ............. *B29C 70/54* (2013.01); *B25B 11/02* (2013.01); *B29C 70/44* (2013.01); *B29D 99/0021* (2013.01); *B29D 99/0025* (2013.01); *B29C 33/30* (2013.01); *B29C 33/306* (2013.01); *Y10T 156/10* (2015.01)

(58) Field of Classification Search
CPC ...... Y10T 156/10; B29C 70/44; B29C 70/54; B25B 11/02; B29D 99/0021; B29D 99/0025

USPC .......................................... 156/60, 285, 286
See application file for complete search history.

(56) References Cited

U.S. PATENT DOCUMENTS

| | | | |
|---|---|---|---|
| 4,209,164 | A | 6/1980 | Brothers |
| 4,647,027 | A | 3/1987 | Shafto |
| 5,848,490 | A | 12/1998 | Lee |
| 6,197,146 | B1 | 3/2001 | Sucic et al. |
| 2001/0005061 | A1 | 6/2001 | Holsinger |
| 2010/0225040 | A1 | 9/2010 | Allen |
| 2011/0143140 | A1 | 6/2011 | Pham et al. |

FOREIGN PATENT DOCUMENTS

| | | |
|---|---|---|
| DE | 102008001498 | 8/2009 |
| EP | 0418843 | 3/1991 |
| WO | WO9846419 | 10/1998 |

OTHER PUBLICATIONS

Angelfire; Sandwich Composites: www.angelfire.com/ma/ameyavaidya/F_sandwch3.htm; dated Jul. 10, 2012.

(Continued)

*Primary Examiner* — Philip Tucker
*Assistant Examiner* — John Blades
(74) *Attorney, Agent, or Firm* — Parsons Behle & Latimer (57) ABSTRACT

A method for forming a composite structure on an assembly jig includes assembling an anchor member and block member on a support plate, arranging composite materials on the support plate adjacent to the anchor member, placing a shroud over the anchor member and block member, and applying heat and pressure to the bond assembly jig to cure the composite materials.

20 Claims, 5 Drawing Sheets

(56) References Cited

OTHER PUBLICATIONS

Patent Cooperation Treaty, International Search Report and Written Opinion for PCT/US2013/056028 dated Apr. 11, 2014.

Patent Cooperation Treaty, Partial Search Report for PCT/US2013/0056028 dated Nov. 26, 2013.

US Patent and Trademark Office; Office Action for U.S. Appl. No. 13/632,753 dated Oct. 23, 2014.

BOND ASSEMBLY JIG AND METHOD

PRIORITY CLAIM

The present application is a divisional of U.S. patent application Ser. No. 13/632,753, filed on Oct. 1, 2012, entitled BOND ASSEMBLY JIG AND METHOD, now U.S. Pat. No. 9,149,991, the contents of which are incorporated by reference herein in their entirety.

FIELD

The present disclosure relates to an apparatus and method for forming a composite structure. In particular, the present disclosure is directed to an improved apparatus and method for forming an airfoil or other composite structure using a bond assembly jig and wherein the composite structure is cured in an autoclave.

BACKGROUND

Modern structures are increasingly manufactured using "composite" materials, where reinforcing materials, such as fibers, are embedded in a polymer matrix, such as a thermoset resin. Composite materials are particularly important where an important feature of the structure is the ratio of strength to weight. Aircraft components are a primary example of structures where the strength to weight ratio is a primary consideration.

One process that is commonly used to form structures from composite materials is a lay-up process. In the lay-up process, the reinforcing materials layers of reinforcing material are laid in a mold, either by hand or by machine. The polymer matrix is then introduced into the mold, filling the voids between the reinforcing materials. The reinforcing materials may be pre-impregnated with resin prior to placement in the mold. The materials are then cured, often by using an autoclave. Alternatively, the materials can be partially cured and then placed in a mold or on a mandrel for forming into a desired shape.

More complex composite structures are commonly built with discrete components. For example, referring to FIG. 1, aircraft structures are often designed with a core component 90, which may comprise a composite material or stiffening support such as a honeycomb structure, and a spar 45, arranged between two skin components 70, 71. In this example, the aircraft structure is formed by placing a partially cured or uncured first skin component 71 in a bond assembly jig, which has a support plate 5 having the desired shape for one surface of the aircraft structure. Additional layers of core component 90 are added, followed by a second cured or uncured skin component 70. A caul component may then be placed over the second skin component, having features that conforms the second skin component into a desired shape. At one end of the structure, the bond assembly jig may comprise a nose block 10 which holds the cured spar 45 in relation to the core component 90 and skin components 70, 71. The bond assembly jig or tool is then typically enclosed in an autoclave 80, which exerts heat and pressure, (represented by arrows in FIG. 1), onto the assembly in order to cure the composite materials.

Figure 1:
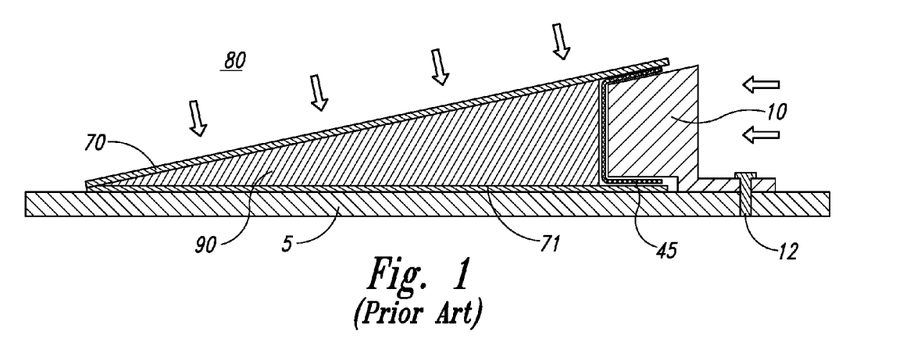
FIG. 1 is a sectioned side view of a bond assembly jig according to the prior art.

When using a bond assembly jig or tool configured with a block member, a common problem occurs in which the pins 12 holding the block member tend to bind due to the lateral force exerted by the autoclave on the block member. Not only does this problem create difficulty for disassembling and reassembling the bond assembly jig. Further, the one-piece block member 10 is rigid, often leaving the adjacent spar 45 and first skin component 71 with excessive porosity or voids.

Accordingly, there is a need for an improved bond assembly jig and method which will prevent the block member pins or fasteners from binding and which will further allow the block member to float in at least one direction.

SUMMARY

The present disclosure addresses the needs in the art by disclosing a bond assembly jig and method for using such to form a composite structure. For example, one aspect of the present disclosure provides an assembly jig for forming a composite structure. The assembly jig comprises a support plate, an anchor member removably attached to the support plate, and a block member that is attached to the anchor section such that the block member may move in a vertical direction independent of the anchor member. The block member may be attached to the anchor member, for example, by using a t-slot. Other embodiments of the assembly jig further comprise a shroud, which extends above the anchor member, and a caul component, which is placed upon the composite materials. The assembly jig may be arranged in an autoclave.

Another aspect of the present disclosure provides an apparatus for assembling and curing a structure formed from composite materials, comprising a support plate, an anchor member, and a block member, as described above, and further comprising a shroud that extends from the support plate to cover at least a portion of the anchor member. In some embodiments, the shroud extends above the anchor member to meet the second skin component or a caul component. Alternatively, the caul component and the shroud may be formed as a unitary piece.

Yet another aspect of the present disclosure provides a method of manufacturing a composite part on an assembly jig/tool, the method comprising the steps of arranging the anchor member on the support plate, arranging the composite materials on the support plate, and connecting the block member to the anchor member. The method further comprises arranging a skin component or a caul component on the composite materials and placing a shroud over the anchor member. The assembly jig is then placed in an autoclave to cure the composite materials.

Other systems, methods, features, and advantages of the present disclosure will be or become apparent to one with skill in the art upon examination of the following drawings and detailed description. The features, functions and advantages that have been discussed can be achieved independently in various embodiments of the present invention or may be combined in yet other embodiments further details of which can be seen with reference to the following description and drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various embodiments of the present disclosure. For example, while the discussion below focuses to some extent on the example of an airfoil constructed for use as part of an aircraft, the disclosure and its various embodiments are not limited to such use. It is understood that other embodiments may be utilized and changes may be made without departing from the scope of the present invention.

Figure 2:
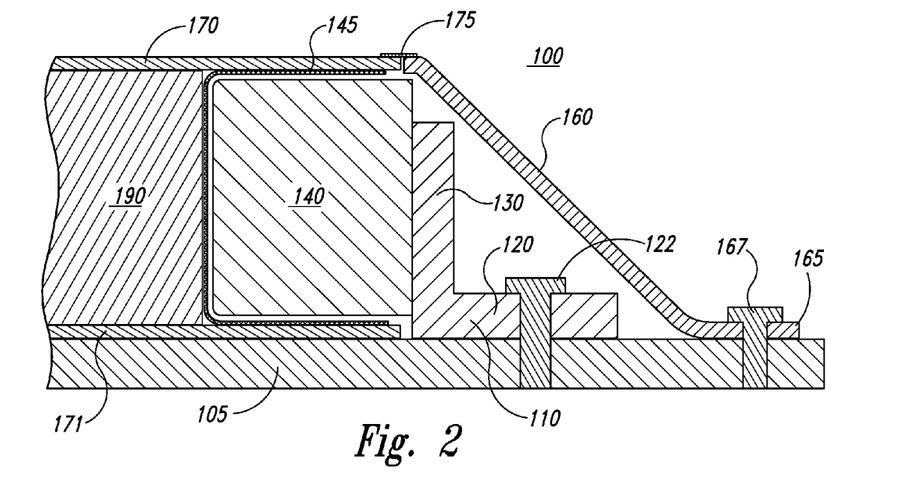
FIG. 2 is a sectioned side view of a bond assembly jig in accordance with an embodiment of the present disclosure.

FIG. 2 illustrates an embodiment of a bond assembly jig 100 in accordance with the present disclosure, comprising a support plate or tool base 105, an anchor member 110, a nose block member (or spar mandrel) 140, and a shroud 160. The bond assembly jig 100 further comprises skin components 170, 171 and a spar 145 surrounding the core component 190. The anchor member 110 comprises a base section 120 and a protruding section 130. The base section 120 abuts the support plate 105 and is held in place by anchor fasteners 120. The shroud further comprises a flange 165, by which the shroud is held against the support plate 105 by shroud fasteners 167. A seal 175 may be placed at the top of the shroud 160 where it meets the second skin component 170. Alternatively, the bond assembly jig may include caul components (not shown), wherein the shroud may be brought to meet an upper caul component.

Figure 3:
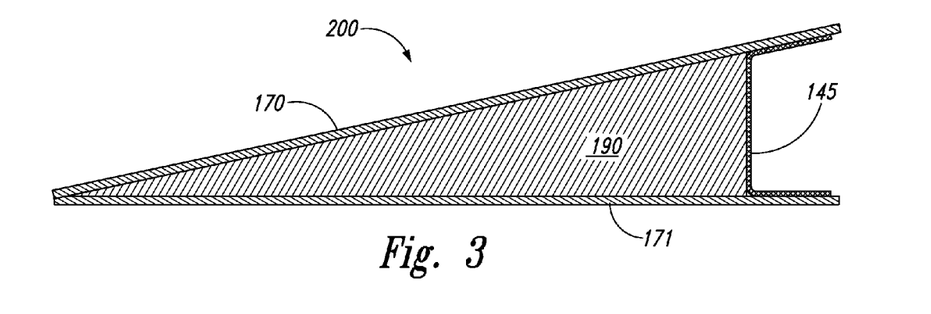
FIG. 3 is a sectioned side view of a composite structure formed in accordance with another embodiment of the present disclosure.

FIG. 3 illustrates another embodiment of the present disclosure, wherein a composite structure 200 is formed using an assembly jig 100. The composite structure 200 of the illustrated embodiment comprises a sandwich structure having a core component 190, formed of a first material, arranged between two skin components 170, 171 that comprise a composite material.

Figure 4:
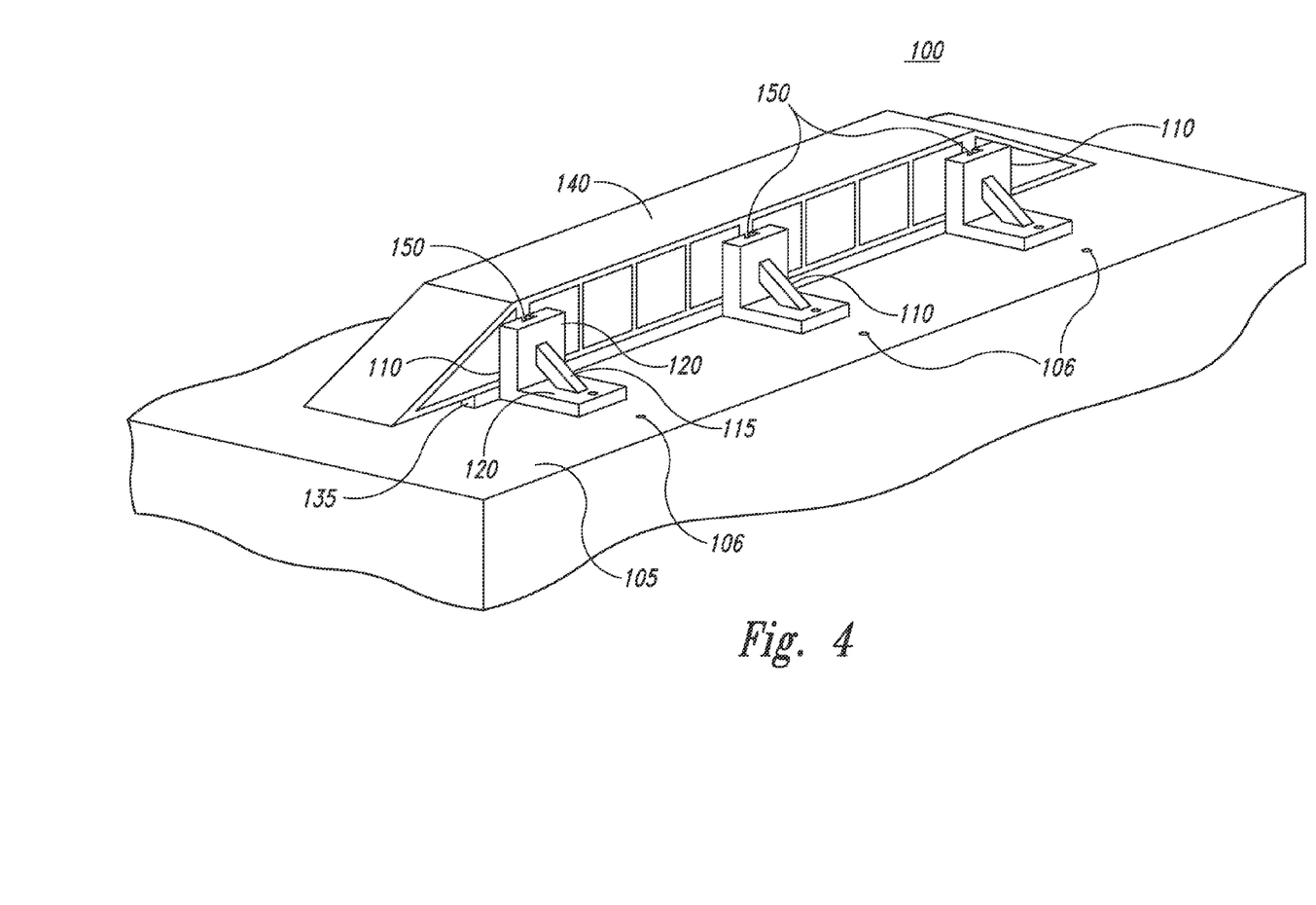
FIG. 4 is an illustration of a partially constructed bond assembly jig in accordance with another embodiment of the present disclosure.
Figure 5:
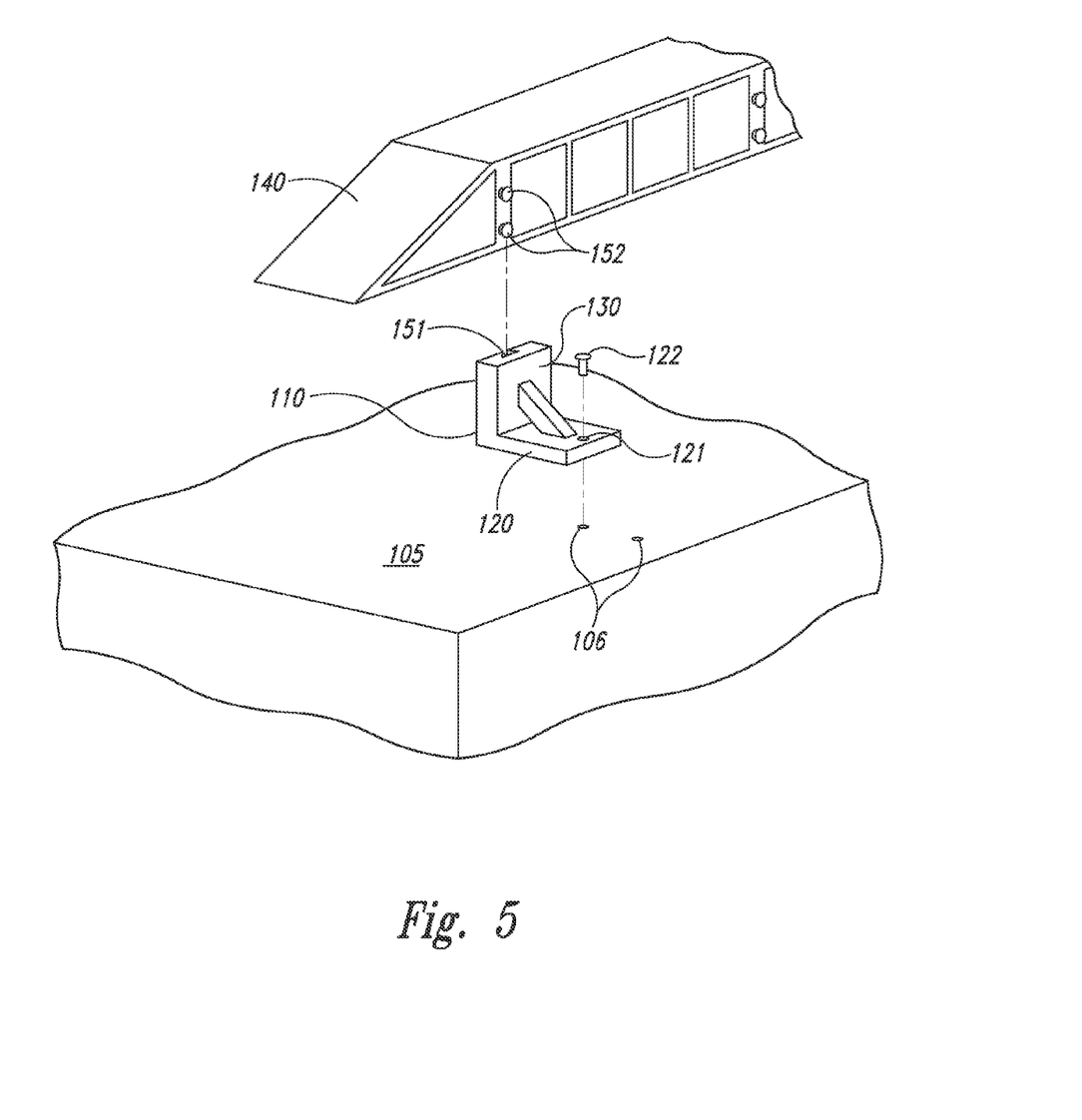
FIG. 5 is a an exploded view of some of the components shown in FIG. 4.
Figure 6:
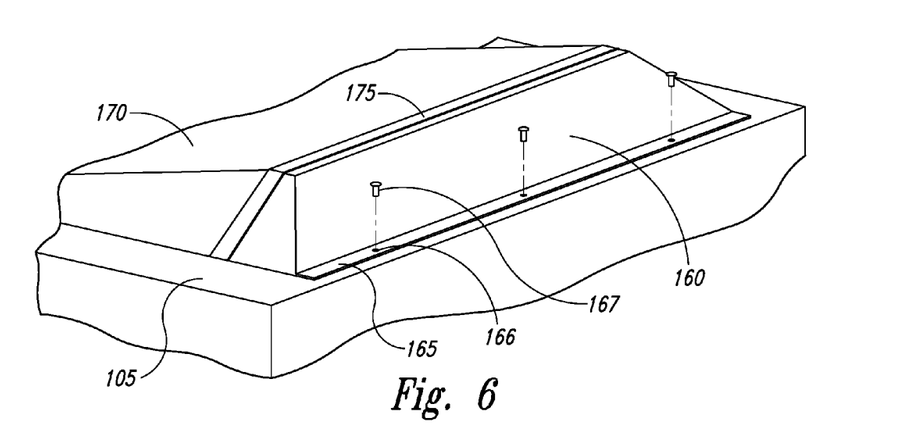
FIG. 6 is an illustration of a fully-assembled bond assembly jig in accordance with one embodiment of the present disclosure.

FIGS. 4-6 illustrate additional features of a bond assembly jig in accordance with another embodiment of the present disclosure, wherein the support plate 105 comprises a plurality of holes 106 for receiving the anchor fasteners 120 and shroud fasteners 167 through anchor holes 121 and flange holes 166, respectively. As shown in FIG. 4, the bond assembly jig 100 may employ a spacer 135 for positioning the block member 140. The block member 140 is connected to the anchor members 110 via a block connector 150. Referring to FIG. 5, the block connector 150 may comprise a female connector 151 and a male connector 152.

Bond assembly jig 100 is constructed with a support plate 105 on which the composite materials are arranged. The support plate 105 is configured having a generic shape and to directly support the skin component 171, which may be supplemented with a lower caul component (not shown). The lower caul component 196 is configured in a specific shape to conform the composite materials into a specific composite structure 200 (see FIG. 3). A lower caul component (not shown) can also be constructed of a material and finished surface that will allow the cured composite structure 200 to be easily removed from the bond assembly jig 100. In other embodiments, the support plate 105 may be configured to have a specific shape that conforms the adjacent composite materials into the desired composite structure 200, wherein the lower skin panel 171 is laid up or placed directly onto the base plate 105. Alternatively, the support plate 105 may be used for a generically shaped structure, wherein a lower caul component (not shown) is provided for other, more specific shapes.

The support plate 105 of the bond assembly jig 100 further comprises a plurality of holes 106 that are arranged to correspond to the flange holes 166 of the shroud 160 and the anchor holes 121 of the anchor members 110. Additional holes 106 may be included in the support plate 105, to allow multiple configurations of anchor members 110 and the shroud 160.

The upper skin component 170 provides an outer barrier of the bond assembly jig and helps determine the shape of the finished composite structure 200. The upper skin component 170, as well as the lower skin component 171, may be constructed according to any method known in the art. Alternatively, the upper skin component 170 may be supplemented with an upper caul component (not shown). In particular, the upper caul component may comprise a semi-rigid structure, which allows the upper caul component to determine the shape of the composite structure 200 while also transferring the pressure exerted by the autoclave to the composite materials within during the curing process.

The composite structure 200, which is a product of the apparatus of the present disclosure, may be a finished structure or a rough structure requiring additional shaping via sanding or other methods. The composite structure 200 may also be designed for combination with other composite structures or other components in order to achieve the final structure. Numerous types of composite materials may be used in the formation of the skin components 170, 171 or the core component 190. Alternatively, the core component 190 may be formed of another material or hollow structure. The skin components 170 and 171 and the core component 190 may be fully or partially cured prior to assembly. Also, the composite materials may be prepared in the first instance in the bond assembly jig 100.

In addition to the skin components 170, 171 and the support plate 105, the shape of the composite structure 200 is also determined by the block member 140. The block member 140 is configured to provide a specific shape at one or more sides of the composite structure 200, allowing the composite structure to be combined with other structures or components to achieve the desired final shape and other attributes. The shape of the block member in the illustrated embodiments approximates a trapezoid in one dimension. Other shapes are also advantageous and are within the scope of this disclosure, as will be apparent to one having skill in the art. In some embodiments, the shape of the block member 140 corresponds to the shape of the spar 145, which is often provided as cured composite material component. A spacer 135 may also be provided during the arrangement of the block member 145. After arranging the lower skin component 171 and the spar 145, the spacer is removed.

In some embodiments, the bond assembly jig 100 comprises one or more anchor members 110 having a base section 120 and a protruding section 130. The base section 120 and the protruding section 130 may be arranged approximately at a right angle, or any other configuration that suits a particular application. The anchor member 110 may further comprise an anchor support 115, which provides stability to the anchor member 110. The base section 120 further includes at least one anchor hole 121, which is used to attach the anchor member 110 to the support plate 105 using, for example, anchor fastener 122. The anchor fastener 122 may comprise a threaded bolt, but may also be any other type of fastener such as a screw or a clamp, which may be used with or without anchor hole 121.

The protruding section 130 of the anchor member 110, extends from the support plate 105 and allows the block member 140 to be attached to the bond assembly jig 110 via block connector 150. In some embodiments, the block connector 150 forms an attachment between the block member 140 and the anchor member 110 such that the block member is allowed to travel in a vertical direction, such as necessary, for example, where changes in temperature and pressure cause the materials to expand or contract. This may be accomplished, for example, using a female connector 151 on the anchor member 110 and a male connector 152 on the block member, wherein the female connector 151 comprises a track or other device that constrains the motion of the block member 140 in only two dimensions. As will be understood by one having ordinary skill in the art, the female connector 151 and the male connector 152 may be located on either the anchor member 110 or the block member 140, so long as there is a corresponding connection on the other piece.

Referring again to FIG. 5, one example of a block connector 150 that allows vertical displacement of the block member 140 is a t-slot connector, wherein the female connector 151 comprises a track having a specific shape in a longitudinal direction. The corresponding male connector 152 may comprise a pin (as shown) or an inverse of the track, wherein the male connector 152 has a shape that corresponds to the shape of the female connector 151, allowing the block member 140 to interface with the anchor member 110 as described above.

Figure 7:
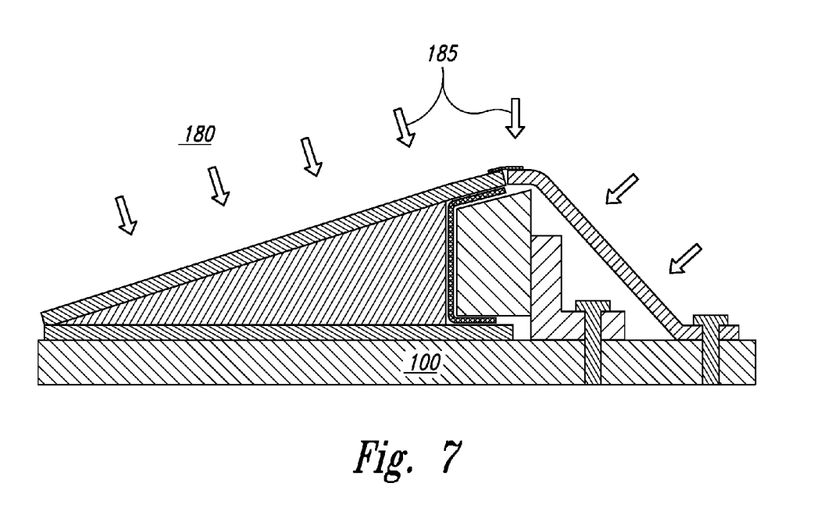
FIG. 7 is a sectioned side view of a bond assembly jig arranged inside of an autoclave in accordance with one embodiment of the present disclosure.

The embodiments illustrated in FIGS. 2 and 6 further comprise a shroud. Turning to FIG. 7, the shroud shields the anchor members 110 and the block member 140 from the heat and pressure, (represented by arrows 185), delivered by the autoclave 180. In this manner, the shroud 160 reduces the likelihood that either the block connector 150 or the anchor fasteners 122 will deform and/or bind. In some embodiments, the shroud 160 comprises a flange 165, which provides a surface that can be placed against the support plate 105. The flange 160 may further include flange holes 166 for attaching the shroud 160 to the support plate 105. As with the anchor fasteners 122 above, the flange fasteners may comprise any sort of appropriate fastener for use with or without the flange 165 or flange holes 166. The shroud 160, which may comprise any appropriate shape for a particular application, extends over at least the base section 120 of the anchor members 110. In some embodiments, the shroud 160 extends above the anchor members 110 and the block member 140, meeting the upper skin component 170, or alternatively, an upper caul component (not shown). A seal 175 may be provided to connect the shroud 160 to the skin component 170 or the block member 140, thereby increasing the rate of heat transfer. The seal 175 may be in the form of a tape, an adhesive, a rigid member, or other device that is available to one having skill in the art.

Figure 8:
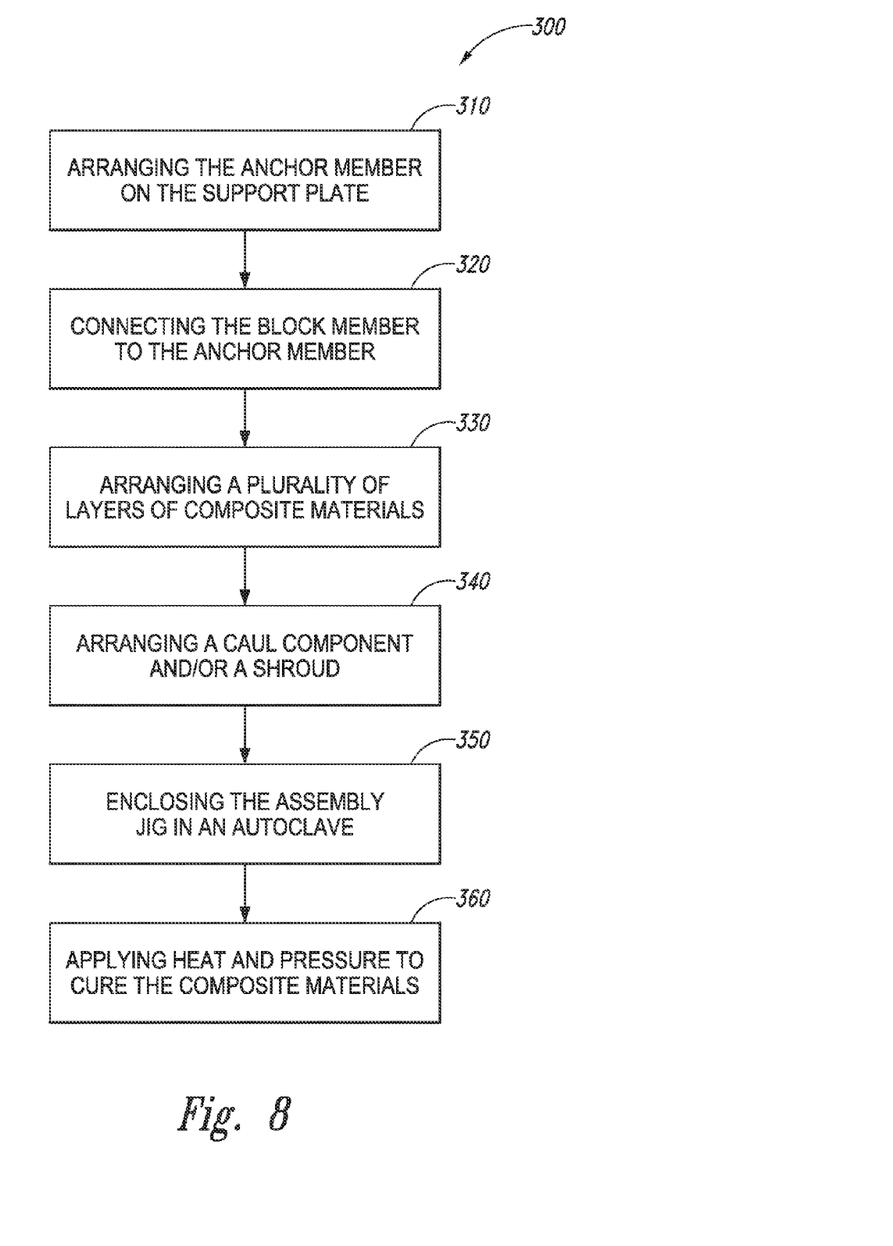
FIG. 8 is a flowchart depicting a method for using a bond assembly jig in accordance with one embodiment of the present disclosure.

In operation, the features of the apparatus described above may be used to reduce the risk of a defect in the composite structure and increase the longevity of the elements of the apparatus. FIG. 8 illustrates one embodiment of a method for constructing a composite structure 300 using the above-described apparatus, wherein a first step comprises arranging the anchor member 110 on the support plate 105 (step 310). The method 300 further comprises a step arranging the block member by connecting the block member 140 to the anchor member 110 (step 320). As described above, this may be done using a block connector 150 that allows the block member 140 to travel in a vertical direction. The block member 140 may also be arranged using a spacer 135 to elevate the block member while the lower skin component 171 and spar 145 are arranged.

The method 300 also comprises arranging a plurality of layers of composite materials (step 330) to be formed into the composite structure 200. Depending on the application, this step may be performed prior to the step of arranging the block member 140 (step 320). Also, this step may comprise arranging a caul component on the composite materials as described above. The method 300 further includes arranging a shroud over the anchor members 110 and block member 140 (step 340). Finally, the method comprises the steps of enclosing the assembly jig in an autoclave (step 350) and applying heat and pressure to cure the composite materials (step 360).

It should be emphasized that the above-described embodiments of the present apparatus and process are merely possible examples of implementations and merely set forth for a clear understanding of the principles of the disclosure. Many different embodiments of the disclosure described herein may be designed and/or fabricated without departing from the spirit and scope of the disclosure. All these and other such modifications and variations are intended to be included herein within the scope of this disclosure and protected by the following claims. Therefore the scope of the disclosure is not intended to be limited except as indicated in the appended claims.

What is claimed is:

1. A method of manufacturing a composite part on an assembly jig, comprising:
   attaching an anchor member on a support plate of an assembly jig;
   connecting a block member to the anchor member;
   arranging a first skin section on the support plate adjacent to the anchor member;
   arranging a spar on the block member and on the first skin section;
   arranging a core section on the first skin section;
   arranging a second skin section on the core section;
   removably attaching a shroud on the support plate, covering at least a portion of the anchor member without covering the first skin section and core section;
   enclosing the assembly jig in a chamber; and
   subjecting the assembly jig to heat and pressure to bond at least the first skin section to the core section.

2. The method of claim 1, wherein attaching the shroud on the support plate further comprises extending the shroud to meet the second skin section.

3. The method of claim 2, further comprising providing a seal between the second skin section and the shroud.

4. The method of claim 1, wherein attaching the shroud on the support plate further comprises arranging the shroud to completely enclose a base section and at least a portion of a protruding section of the anchor member.

5. The method of claim 1, further comprising forming the first skin section, the core section and the second skin section into an airfoil shape.

6. The method of claim 1, wherein connecting the block member to the anchor member further comprises movably connecting the block member to the anchor member, such that the block member can move in a direction that is substantially perpendicular to the support plate.

7. The method of claim 6, wherein connecting the block member to the anchor member further comprises connecting the block member to a protruding section of the anchor member using a t-slot.

8. The method of claim 1, wherein enclosing the assembly jig in a chamber and subjecting the assembly jig to heat and pressure further comprises placing the assembly jig in an autoclave.

9. The method of claim 1, wherein arranging the second skin section on the core section further comprises arranging the second skin section that is at least partially cured.

10. A method for assembling and curing a structure formed from composite materials, comprising:
- removably fastening an anchor member upon a support plate of an assembly jig having a support surface;
- moveably attaching a block member to the anchor member in a manner that allows the block member to travel in a direction that is substantially perpendicular to the support surface;
- placing a structure of composite materials upon the support plate adjacent to the anchor member; and
- removably fastening a shroud to the support surface, such that the shroud extends from the support plate and covers at least a portion of the anchor member without covering the structure of composite materials.

11. The method of claim 10, further comprising providing a seal between the shroud and the structure of composite materials.

12. The method of claim 10, further comprising enclosing the assembly jig in an autoclave and subjecting the assembly jig to heat and pressure.

13. The method of claim 10, wherein moveably attaching the block member to the anchor member further comprises attaching the block member substantially perpendicularly to a protruding section of the anchor member.

14. The method of claim 13, wherein moveably attaching the block member to the protruding section further comprises attaching the block member using a t-slot.

15. The method of claim 10, wherein placing the structure of composite materials upon the support plate further comprises placing composite materials including a first skin component, a core component, and a second skin component that is at least partially cured.

16. The method of claim 15, further comprising extending the shroud to meet the second skin component.

17. A method for assembling and curing a structure formed from composite materials, comprising:
- removably fastening a base section of an anchor member to a support plate of an assembly jig, the base section having a protruding section that extends from and is oriented generally at a right angle with respect to the base section;
- placing composite materials upon a support surface of the support plate, wherein the composite materials are adjacent to the anchor member;
- slidably attaching a block member to a first side of the protruding section of the anchor member in a manner that allows the block member to travel in a direction that is substantially perpendicular to the support surface;
- removably fastening a shroud to the support plate, the shroud covering at least a portion of the anchor member and the shroud covering at least a portion of the protruding section without covering the composite materials; and
- placing the assembly jig with the composite materials in an autoclave, and subjecting the assembly jig to heat and pressure.

18. The method of claim 17, wherein the shroud is arranged to completely enclose the base section and the first side of the protruding section of the anchor member.

19. The method of claim 17, further comprising providing a seal between a top of the shroud and the composite materials.

20. The method of claim 17, wherein placing the composite materials upon the support plate further comprises placing composite materials including a first skin component, a core component, and a second skin component that are at least partially cured.

* * * * *